United States Patent
Okayama et al.

(10) Patent No.: US 6,319,991 B1
(45) Date of Patent: Nov. 20, 2001

(54) PROPYLENE POLYMER BLENDS, PROCESSES OF PRODUCING THE SAME AND POLYPROPYLENE RESIN COMPOSITIONS

(75) Inventors: Chikashi Okayama; Takanori Nakashima; Shinichi Akitaya; Yoshitaka Sumi, all of Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/081,678

(22) Filed: May 20, 1998

(30) Foreign Application Priority Data

May 22, 1997 (JP) .................................................. 9-132176
May 22, 1997 (JP) .................................................. 9-132177

(51) Int. Cl.⁷ .......................... C08L 23/14; C08L 23/16; C08F 10/06; C08F 210/06
(52) U.S. Cl. ....................... 525/240; 525/216; 525/322; 525/323; 524/451; 524/394; 524/399; 524/108; 524/132
(58) Field of Search .................... 525/240, 322, 525/323; 524/451, 394, 399, 108, 132, 216

(56) References Cited

U.S. PATENT DOCUMENTS

| | | | |
|---|---|---|---|
| 4,547,552 | 10/1985 | Toyota et al. | |
| 4,948,841 | * 8/1990 | Kasahara et al. | 525/240 |
| 5,298,561 | * 3/1994 | Cecchin et al. | 525/240 |
| 5,654,372 | * 8/1997 | Sadatoshi et al. | 525/323 |

FOREIGN PATENT DOCUMENTS

| | | |
|---|---|---|
| 0 373 660 | 6/1990 | (EP) . |
| 457455 | * 11/1991 | (EP) . |
| 0 472 946 | 3/1992 | (EP) . |
| 0 557 953 | 9/1993 | (EP) . |
| 56-72042 | 6/1981 | (JP) . |
| 57-63350 | 4/1982 | (JP) . |
| 1-272612 | 10/1989 | (JP) . |
| 3-119003 | 5/1991 | (JP) . |
| 3-205439 | 9/1991 | (JP) . |
| 3-220251 | 9/1991 | (JP) . |
| 4-103604 | 4/1992 | (JP) . |
| 5-54861 | 8/1993 | (JP) . |
| 5-331327 | 12/1993 | (JP) . |
| 6-25367 | 2/1994 | (JP) . |
| 6-116391 | 4/1994 | (JP) . |
| 6-93061 | 4/1994 | (JP) . |
| 6-93062 | 4/1994 | (JP) . |
| 6-145268 | 5/1994 | (JP) . |
| 7-25860 | 3/1995 | (JP) . |
| 7-173233 | 7/1995 | (JP) . |
| 2733060 | 12/1997 | (JP) . |
| 9-316145 | 12/1997 | (JP) . |
| 9-324022 | 12/1997 | (JP) . |
| 10-87744 | 4/1998 | (JP) . |

OTHER PUBLICATIONS

Kakugo et al., Journal of Sumitomo Chemical Co., 1979–1, pp 22–29.*
Alger, Polymer Scienc Dictionary, 2nd ed., Chapman & Hall, New Yor, p. 290 (1997).*
Flory, Principles of Polymer Chemistry, Cornell University Press, Ithica, NY, pp 511–514 (1953).*

* cited by examiner

*Primary Examiner*—Donald R. Wilson
(74) *Attorney, Agent, or Firm*—McDermott, Will & Emery (57) ABSTRACT

A propylene polymer blend is disclosed which comprises (A) a propylene-α-olefin random copolymer with a propylene content of 90 to 99% by weight and (B) a propylene-α-olefin random copolymer with a propylene content of 55 to 90% by weight, wherein the intrinsic viscosity ($[\eta_B]$) of the copolymer B ranges from 1.3 to 3.5 dl/g, the ratio ($[\eta_B]/[\eta_A]$) of the intrinsic viscosity ($[\eta_B]$) of the copolymer B to the intrinsic viscosity ($[\eta_A]$) of the copolymer A ranges from 0.5 to 1.3 and a product (($[\eta_B]/[\eta_A]$)×($W_A/W_B$)) of the intrinsic ratio ($[\eta_B]/[\eta_A]$) of both copolymers and the weight ratio ($W_A/W_B$) of both copolymers ranges from 1.0 to 4.5. A polypropylene resin composition comprises 99 to 99.9999% by weight of the propylene polymer blend and 1 to 0.0001% by weight of an α-crystal nucleating agent.

8 Claims, 1 Drawing Sheet

FIG. 1

PROPYLENE POLYMER BLENDS, PROCESSES OF PRODUCING THE SAME AND POLYPROPYLENE RESIN COMPOSITIONS

FIELD OF THE INVENTION

This invention relates to propylene polymer blends, processes of producing the same and polypropylene resin compositions comprising said polymer blends as a main component. More particularly, the invention relates to propylene polymer blends, polypropylene resin compositions which are excellent in transparency, stress-whitening resistance and low-temperature impact resistance and processes of producing said propylene polymer blends by a vapor phase polymerization.

BACKGROUND OF THE INVENTION

Polypropylene resins are relatively cheap and have excellent thermal and mechanical properties, and so have been used in a wide variety of the fields. In general, however, a propylene homopolymer has high rigidity, but is inferior in impact resistance, especially low-temperature impact resistance. As a composition containing the propylene homopolymer improved in low-temperature impact resistance, there has been employed in each of industrial fields including automobiles and household appliances, a propylene block copolymer composition wherein the propylene homopolymer is initially produced and subsequently an ethylene-propylene random copolymer component is produced.

Those propylene block copolymer compositions which have been used hitherto are excellent in impact resistance, but inferior in transparency to homopolymer and have a high whitening on impacting. As a method to improve the disadvantage of whitening on impacting in the propylene block copolymer, there have been proposed the method of increasing the ethylene content in the copolymer and the method of adding polyethylene to the propylene block copolymer composition. Both methods are excellent in improving the whitening on impacting, while lowering the transparency of the product.

JP-A-5-331327 discloses a polymer composition comprising a propylene block copolymer composition with the specified ratio of the intrinsic viscosity of a propylene homopolymer component to that of an ethylene propylene random copolymer component.

JP-A-6-145268 discloses a polymer composition with the specified intrinsic viscosity of a propylene homopolymer component, the specified ratio of the intrinsic viscosity of a propylene homopolymer component to that of an ethylene propylene copolymer component and the specified ethylene content in the ethylene propylene random copolymer component.

JP-A-56-72042 discloses a polyolefin resin composition comprising an ethylene-propylene block copolymer and an ethylene polymer.

JP-A-57-63350 discloses a propylene copolymer composition comprising a propylene-ethylene block copolymer and an ethylene-alpha olefin copolymer.

Those polymer compositions have been more improved than conventional propylene polymer blends in respect of the impact-whitening resistance and transparency from the measured result of haze for the injection-molded articles of the polymer compositions, but more improvements have been desired for the polymer compositions. In addition, blending various components may bring about unbalance of the properties due to scattered dispersibility of each component in the final product.

SUMMARY OF THE INVENTION

An object of the invention is to provide a propylene polymer blend having excellent balance of various properties such as transparency, stress-whitening resistance and low-temperature impact resistance, etc., and a process of producing the polymer blend.

Another object of the invention is to provide a polypropylene resin composition comprising said propylene polymer blend as a main component, suitable for the production of the molded articles having excellent balance of various properties such as transparency, stress-whitening resistance and low-temperature impact resistance, etc.

Other objects of the invention will be apparent from the description mentioned later.

As a result of various investigations to attain the above-described objects, we have found that a propylene polymer blend comprising (A) a propylene-α-olefin random copolymer and (B) a propylene-α-olefin random copolymer with different α-olefin contents from the random copolymer (A) has excellent balance of the transparency, stress-whitening resistance and low-temperature impact resistance, when the intrinsic viscosity of the copolymer B, the ratio of the intrinsic viscosities of both copolymers and a product of the intrinsic ratio of both copolymers and the weight ratio of both copolymers are within the the prescribed ranges.

In accordance with the present invention there is provided a propylene polymer blend comprising (A) a propylene-α-olefin random copolymer with a propylene content of 90 to 99% by weight and (B) a propylene-α-olefin random copolymer with a propylene content of 55 to 90% by weight, wherein the intrinsic viscosity ($[\eta_B]$) of the copolymer B ranges from 1.3 to 3.5 dl/g, the ratio ($[\eta_A]/[\eta_B]$) of the intrinsic viscosity ($[\eta_B]$) of the copolymer B to the intrinsic viscosity ($[\eta_A]$) of the copolymer A ranges from 0.5 to 1.3 and a product (($[\eta_B]/[\eta_A]$)×($W_A/W_B$)) of the intrinsic ratio ($[\eta_B]/[\eta_A]$) of both copolymers and the weight ratio ($W_A/W_B$) of both copolymers ranges from 1.0 to 4.5.

The present invention also provides a process of producing the propylene polymer blend which comprises in sequence:

(a) carrying out a first polymerization step wherein propylene and other α-olefins than propylene are copolymerized in a vapor phase in the presence of a catalyst for a stereoregular olefin polymerization which comprises a combination of a titanium-containing solid catalyst component having an average particle size of 20–300 μm, an organoaluminum compound of the formula $AlR^1{}_m X_{3-m}$ wherein $R^1$ is a hydrocarbyl group of 1–20 carbons, X is a halogen atom and m is a positive number of $3 \geq m \geq 1.5$, and an organosilicon compound of the formula $R^2{}_X R^3{}_Y Si(OR^4)_Z$ wherein $R^2$ and $R^4$ is a hydrocarbyl group, $R^3$ is a hydrocarbyl group or a hydrocarbyl group containing a hetero atom, X, Y and Z have a relationship of $0 \leq X \leq 2$, $1 \leq Y \leq 3$, $1 \leq Z \leq 3$, and X+Y+Z=4, to produce 90 to 50% by weight of a propylene-α-olefin random copolymer (A) based on the total weight of the polymer blend and then (b) carrying out a second polymerization step wherein propylene and other α-olefins than propylene are copolymerized to produce 10 to 50% by weight of a propylene-α-olefin random copolymer (B) having a propylene content of 55 to 90% by weight, based on the total weight of the polymer blend.

The present invention further provides a polypropylene resin composition which comprises 99 to 99.9999% by weight of the propylene polymer blend and 1 to 0.0001% by weight of an α-crystal nucleating agent.

DETAILED DESCRIPTION OF THE INVENTION

In the propylene polymer blend of the invention, the propylene-α-olefin random copolymer (A) comprises a random copolymer of propylene and other olefins than propylene, the propylene content of which is from 90 to 99% by weight. If the propylene content in the copolymer (A) is too low, the heat resistance of the molded articles will lower. If it is too high, the stress-whitening resistance will be insufficient. The propylene content in the copolymer (A) is preferably 92 to 99% by weight.

α-Olefin components for the propylene-α-olefin random copolymer (A) can include ethylene, 1-butene, 1-pentene, 1-hexene, 1-octene, 1-decene, 1-dodecene, 4-methyl-1-pentene, 3-methyl-1-pentene and the like. Ethylene is preferable from a viewpoint of manufacturing cost.

Other component in the propylene polymer blend, the propylene-α-olefin random copolymer (B) is a random copolymer of propylene and other α-olefins than propylene, the propylene content of which is from 55 to 90% by weight. If the propylene content in the copolymer (B) is too high, the low-temperature impact resistance of the molded articles will be insufficient. If it is too low, the transparency will lower. The propylene content in the copolymer (B) is preferably from 55 to 85% by weight.

α-Olefin components for the propylene-α-olefin random copolymer (B) can include similar compounds as in the copolymer (A). Ethylene is preferable.

For the propylene-α-olefin random copolymer (B), the intrinsic viscosity $[\eta_B]$ is the range of 1.3 to 3.5 dl/g, preferably 1.5 to 3.0 dl/g, and the ratio $([\eta_B]/[\eta_A])$ of the intrinsic viscosity of the copolymer (B) to that of the copolymer (A)$([\eta_A])$ is in the range of from 0.5 to 1.3, preferably from 0.6 to 1.2. The intrinsic viscosity of the copolymer (A) is determined in tetralin at 135° C.

Since the intrinsic viscosity $([\eta_B])$ of the propylene-α-olefin random copolymer (B) cannot be directly measured, it is derived from the intrinsic viscosity $([\eta_A])$ of the propylene-α-olefin random copolymer (A), the intrinsic viscosity $([\eta_{WHOLE}])$ of the final product, propylene polymer blend and the weight % $(W_B)$ of the propylene-α-olefin random copolymer (B) which can be directly measured, in accordance with the following equation.

$$[\eta_B] = \{[\eta_{WHOLE}] - (1 - W_B/100)[\eta_A]\}/(W_B/100)$$

The intrinsic viscosity $([\eta_B])$ of the propylene-α-olefin random copolymer (B) has an effect on the molding cycle and the transparency of the molded articles. The ratio $([\eta_B]/[\eta_A])$ of the intrinsic viscosity $([\eta_B])$ of the propylene-α-olefin random copolymer (B) to the intrinsic viscosity $([\eta_A])$ of the propylene-α-olefin random copolymer (A) has an effect on the dispersibility of the propylene-α-olefin random copolymer (B) in the propylene-α-olefin random copolymer (A). As the intrinsic viscosity $([\eta_B])$ of the propylene-α-olefin random copolymer (B) is higher, the molding cycle lowers. If the viscosity ratio of the copolymer (B) to the copolymer (A) is too high, the transparency will lower. If it is too low, the low-temperature impact resistance will be insufficient, which results in no attainment of the aimed properties.

In the propylene polymer blend of the present invention, the weight ratio $(W_A/W_B)$ of the propylene-α-olefin random copolymer (A) to the propylene-α-olefin random copolymer (B) is such that a product $([\eta_B]/[\eta_A]) \times (W_A/W_B))$ of the intrinsic ratio of both copolymers $([\eta_B]/[\eta_A])$ and the weight ratio of both copolymers $(W_A/W_B)$ is in the range of from 1.0 to 4.5. The product of the weight ratio and the intrinsic viscosity of both copolymers is an index showing the stress-whitening resistance of the composition. Lower value can improve the stress-whitening resistance, but provide more reduction in the heat resistance and rigidity. On the other hand, higher value does not provide a desired improvement in stress-whitening resistance.

The propylene polymer blend of the invention comprises 90 to 50% by weight of the propylene-α-olefin random copolymer (A) and 10 to 50% by weight of the propylene-α-olefin random copolymer (B) on the weight basis of the polymer blend. Preferable polymer blend comprises 80 to 50% by weight of the propylene-α-olefin random copolymer (A) and 20 to 50% by weight of the propylene-α-olefin random copolymer (B) on the weight basis of the polymer blend, by which the low-temperature impact resistance of the molded articles can be more improved.

The propylene polymer blend of the invention satisfying the above-mentioned various properties can be suitably used as a raw material for the manufacture of molded articles which are excellent in transparency, stress-whitening resistance and low-temperature impact resistance.

The propylene polymer blend of the invention can be produced by any method if it satisfies the above-mentioned various properties, but suitably produced by the two-stage continuous polymerization process in a vapor phase as mentioned above.

The two-stage continuous polymerization process comprises continuously conducting the first polymerization step wherein propylene and other α-olefins than propylene are copolymerized in a vapor phase in the presence of a catalyst for a stereoregular olefin polymerization comprising a combination of a titanium-containing solid catalyst component having an average particle size of 20 to 300 μm, an organoaluminum compound and an organosilicon compound, to produce a propylene-α-olefin random copolymer (A) in a prescribed amount and with the prescribed composition ratio, and successively conducting the second polymerization step wherein propylene and other α-olefins than propylene are copolymerized with varying composition ratio, to produce the remaining propylene-α-olefin random copolymer (B).

As the titanium-containing solid catalyst components can be used in the processes of the present invention, in addition to known catalysts, those having the average particle size of 20 to 300 μm wherein titanium compounds are supported on an inorganic carrier such as magnesium compounds, silica and alumina, an organic carrier such as polystyrene or on such carriers optionally reacted with an electron donor such as ethers, esters and the like. Concrete examples are the titanium-containing solid catalyst components produced by spraying an alcohol solution of a magnesium compound, partially drying a solid component and treating the dry solid component with titanium halides and an electron donor (JP-A-3-119003) and the titanium-containing solid catalyst components prepared by dissolving a magnesium compound in tetrahydrofuran/alcohol/electron donor and treating magnesium precipitated by a TiCl$_4$ alone or a combination thereof with an electron donor, with titanium halides and an electron donor (JP-A-4-103604).

The titanium-containing catalyst components use those having an average particle size of 20 to 300 μm, preferably 20 to 150 μm. If the average particle size of the titanium-containing catalyst component is too low, the flowability of the powder of the resultant propylene polymer blend is remarkably lost, thus resulting in the contamination within the polymerization system by adhesion of the powders to the wall of the polymerization reactor and the agitating element, etc., and further resulting in difficulty in the transfer of the powders discharged from the polymerization reactor, which leads to a great hindrance to a steady operation.

For the titanium-containing catalyst component are preferable those having the degree of uniformity of not more than 2.0 in the normal distribution. If the degree of uniformity is higher, the powder flowability of the propylene polymer blend is getting worse, so that continuous steady operation becomes difficult.

As the organoaluminum compounds can be used those And compounds of the formula AlR$^1_m$X$_{3-m}$ wherein R$^1$ is a hydrocarbyl group of 1–20 carbons, X is a halogen atom and m is a positive number of $3 \geq m \geq 1.5$.

Specifically, the following compounds are recited; trimethylaluminum, triethylaluminum, tri-n-propylaluminum, tri-n-butylaluminum, tri-iso-butylaluminum, dimethylaluminum chloride, diethylaluminum chloride, methylaluminum sesquichloride, di-n-propylaluminum monochloride, ethylaluminum sesquichloride, ethylaluminum dichloride, diethylaluminum iodide, ethoxydiethylaluminum, etc. Preferably, triethylaluminum is used.

These organoaluminum compounds may be used alone or in admixture with two or more kinds.

As the organosilicon compounds can be used those compounds of the formula R$^2_x$R$^3_y$Si(OR$_4$)$_z$ wherein R$^2$ and R$^4$ are a hydrocarbyl group, R$^3$ is a hydrocarbyl group or a hydrocarbyl group containing a hetero atom, X, Y and Z have the relationship of $0 \leq X \leq 2$, $1 \leq Y \leq 3$, $1 \leq Z \leq 3$ and X+Y+Z=4.

Specifically, the following compounds are recited, methyltrimethoxysilane, ethyltrimethoxysilane, n-propyltrimethoxysilane, phenylmethyldimethoxysilane, t-butyltrimethoxysilane, phenyltriethoxysilane, methylethyldimethoxysilane, methylphenyldiethoxysilane, dimethyldimethoxysilane, dimethyldiethoxysilane, diisopropyldimethoxysilane, diisobutyldimethoxysilane, di-t-butyldimethoxysilane, diphenyldimethoxysilane, trimethylmethoxysilane, cyclohexylmethyldimethoxysilane, trimethylethoxysilane, etc. Preferably, diisobutyldimethoxysilane, diisopropyldimethoxysilane, di-t-butyldimethoxysilane, cyclohexylmethyldimethoxysilane and diphenyldimethoxysilane are used.

These organosilicon compounds may be used alone or in admixture with two or more kinds.

The catalysts for a stereoregular olefin polymerization comprising a combination of the titanium-containing solid catalyst component, the organoaluminum compound and the organosilicon compound are used in the copolymerization of propylene with other α-olefins than propylene in the first polymerization step, but it is preferable to use the titanium-containing solid catalysts which have been preactivated with α-olefins.

The preactivation of the titanium-containing solid catalyst component can be conducted in the presence or absence of a similar organoaluminum compoud as used in the first polymerization step. Usually, the organoaluminum compound is used in the range of 0.1 to 40 mols, preferably 0.3 to 20 mols per mol of a titanium atom in the titanium-containing solid catalyst component, and it is reacted at 10–80° C. over a period of 10 minutes to 48 hours with α-olefin in an amount of 0.1 to 100 grams, preferably 0.5 to 50 grams per gram of the titanium-containing solid catalyst component. Preferable organoaluminum compound is triethyl aluminum.

For the preactivation, a similar organosilicon compound as previously used in the first polymerization step may be used in the range of 0.01 to 10 mols, preferably 0.05 to 5 mols per mol of the organoaluminum compound. Preferable organosilicon compounds include diisobutyldimethoxysilane, diisopropyldimethoxysilane, di-t-butyldimethoxysilane, cyclohexylmethyldimethoxysilane and diphenyldimethoxysilane.

α-olefins used in the preactivation of the titanium-containing solid catalyst component include ethylene, propylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, 3-methyl-1-pentene, etc. These olefins may be used alone or in admixture with two or more kinds. In the polymerization, a molecular weight modifier such as hydrogen can be used in combination to modify the molecular weight of the polymer.

The inert solvents used in the preactivation of the titanium-containing solid catalyst component are those which do not give a remarkable effect on the polymerization reaction, which include liquid saturated hydrocarbons such as hexane, heptane, octane, decane, dodecane and liquid paraffin and a silicone oil having a dimethylpolysiloxane structure. These inert solvents may be a single solvent or a mixed solvent of two or more kinds.

It is preferable to use these inert solvents after removal therefrom of impurities adversely affecting the polymerization, such as water and sulfur compounds.

In the process for the production of the propylene polymer blend according to the present invention, there are successively carried out the first polymerization step wherein propylene and other α-olefins than propylene are copolymerized in a vapor phase in the presence of the preactivated titanium-containing solid catalyst component and then the second polymerization step wherein propylene and α-olefins are copolymerized with a different propylene content from the first polymerization step.

The first polymerization step is not limited to a vapor phase polymerization, and may use a slurry polymerization and a bulk polymerization. The subsequent second polymerization step is preferably a vapor phase polymerization. Therefore, the present invention uses a vapor phase polymerization also in the first polymerization step. In case where slurry and bulk polymerizations are used as the second polymerization step, the copolymer dissolves out in the solution, which results in the difficulty in the continuation of a stable operation.

The polymerization conditions for the propylene-α-olefin random copolymer (A) are varied depending on a polymerization process. For the vapor phase polymerization process, propylene and other α-olefins than propylene are fed at a polymerization temperature of 20 to 120° C., preferably 40 to 100° C. and at a polymerization pressure of from atmospheric pressure to 9.9 MPa, preferably 0.59 to 5.0 MPa in the presence of a catalyst for stereoregular olefin polymerization comprising a titanium-containing solid catalyst component which has been preactivated by mixing and agitating prescribed amounts of powders, an organoaluminum component and an organosilicon compound, to produce the propylene-α-olefin random copolymer (A). The molar ratio, Al/Ti of the organoaluminum compound used to the titanium-containing solid catalyst component used is 1–500, preferably 10–300. In this case, the molar number of the titanium-containing solid catalyst component refers to substantially the gram atom number of Ti in the titanium-containing solid catalyst component.

The molar ratio, Al/Si of the organoaluminum component used to the organosilicon compound used is 1–10, preferably 1.5–8.

If the molar ratio of Al/Si is too high, a low crystalline component in the propylene-α-olefin random copolymer (A) will increase, the rigidity of the propylene polymer blend will be insufficient and the flowability of the powders will lower, resulting in the difficulty in the continuation of a stable operation. If the molar ratio of Al/Si is too low, the polymerization activity will lower remarkably, resulting in lowered productivity.

To modify the molecular weight of the propylene-α-olefin random copolymer (A), a molecular weight modifier such as hydrogen can be used upon polymerization. It is performed so that the intrinsic viscosity of the propylene-α-olefin random copolymer (A) can meet the requirements for the present invention. After the propylene-α-olefin random copolymer (A) was produced, a part of the resultant powders is taken out and used for the measurement of the intrinsic viscosity ($[\eta]_A$), melt flow rate ($MFR_A$) and polymerization yield per weight of catalyst.

Subsequently to the production of the propylene-α-olefin random copolymer (A) in the first polymerization step, the second polymerization step is carried out wherein a mixed monomer of propylene and other α-olefins than propylene is copolymerized in a different composition ratio from the first polymerization step at a polymerization temperature of 20 to 120° C., preferably 40 to 100° C. and at a polymerization pressure of from atmospheric pressure to 9.9 MPa, preferably 0.59 to 5.0 MPa, to produce the propylene-α-olefin random copolymer (B). The α-olefin content in the propylene-α-olefin random copolymer (B) is controlled so as to provide 10 to 45% by weight, by controlling a gas molar ratio of an α-olefin monomer to a propylene monomer in the comonomer gas.

The weight of the propylene-α-olefin random copolymer (B) relative to the weight of the propylene-α-olefin random copolymer (A) is adjusted so as to provide 10 to 50% by weight, by control of the polymerization time and using an agent for regulating the polymerization activity of the catalyst such as carbon monoxide and hydrogen sulfide. Further, the molecular weight of the propylene-α-olefin random copolymer (B) is regulated so that the intrinsic viscosity ($[\eta_B]$) of the propylene-α-olefin random copolymer (B) can meet the requirements for the propylene polymer blend, by adding a molecular weight modifier such as hydrogen upon the polymerization of the propylene-α-olefin random copolymer (B).

The polymerization system may be any of batch, semi-continuous and continuous systems, but a continuous polymerization is industrially preferable.

After completion of the second polymerization step, the monomer can be removed from the polymerization system to prepare a particulate polymer. The resultant polymer is used for the measurement of the intrinsic viscosity ($[\eta_{WHOLE}]$), α-olefin content and polymerization yield per weight of the catalyst.

The propylene polymer blend of the present invention can be used as a raw material for the molded articles having various shapes formed by a variety of molding methods such as injection, extrusion or the like. In molding, the propylene polymer blend may be incorporated with known additives used for conventional polyolefins which include antioxidants, neutralizers, antistatic agents, weathering agents, inorganic fillers such as talc, calcium carbonate, silica, mica or the like.

The polypropylene resin composition of the present invention comprises the propylene polymer blend satisfying the various properties as mentioned above and small amounts of an α-crystal nucleating agent and can be suitably used as a raw material for the manufacture of the molded articles which are excellent in transparency, stress-whitening resistance and low-temperature impact resistance.

The α-crystal nucleating agents which can be used in the present invention can include inorganic compounds, carboxylic acids or the metal salts thereof, dibenzylidenesorbitol compounds, arylphosphate compounds, mixtures of cyclic polyvalent metal aryl phosphate compounds with alkali metal salts of aliphatic monocarboxylic acids or basic aluminum lithium hydrocarbonate hydrate and polymeric compounds.

Examples of inorganic compounds can include talc, alum, silica, titanium oxide, calcium oxide, magnesium oxide, carbon black, clay minerals or the like.

Examples of carboxylic acids can include those excluding aliphatic monocarboxylic acids, such as malonic acid, succinic acid, adipic acid, maleic acid, azelaic acid, sebacic acid, dodecanic diacid, citric acid, butanetricarboxylic acid, butanetetracarboxylic acid, naphthenic acid, cyclopentanecarboxylic acid, 1-methylcyclopentanecarboxylic acid, 2-methylcyclopentanecarboxylic acid, cyclopentanecarboxylic acid, cyclohexanecarboxylic acid, 1-methylcyclohexanecarboxylic acid, 4-methylcyclohexanecarboxylic acid, 3,5-dimethylcyclohexanecarboxylic acid, 4-butylcyclohexanecarboxylic acid, 4-octylcyclohexanecarboxylic acid, cyclohexanecarboxylic acid, 4-cyclohexane-1,2-dicarboxylic acid, benzoic acid, toluic acid, xylic acid, ethylbenzoic acid, 4-t-butylbenzoic acid, salicylic acid, phthalic acid, trimellitic acid, pyromellitic acid or the like. The metal salts of the carboxylic acids can include normal salts or basic salts of the carboxylic acids such as lithium, sodium, potassium, magnesium, calcium, strontium, barium, zinc and aluminum of said acids.

Examples of dibenzylidenesorbitol compounds can include 1.3,2.4-dibenzylidenesorbitol, 1.3-benzylidene-2.4-p-methylbenzylidenesorbitol, 1.3-benzylidene-2.4-p-ethylbenzylidenesorbitol, 1.3-p-methylbenzylidene-2.4-benzylidenesorbitol, 1.3-p-ethylbenzylidene-2.4-benzylidenesorbitol, 1.3-p-methylbenzylidene-2.4-p-ethylbenzylidenesorbitol, 1.3-p-ethylbenzylidene-2.4-p-methylbenzylidenesorbitol, 1.3,2.4-bis(p-methylbenzylidene)sorbitol, 1.3,2.4-bis(p-ethylbenzylidene)sorbitol, 1.3,2.4-bis(p-n-propylbenzylidene)sorbitol, 1.3,2.4-bis(p-i-propylbenzylidene)sorbitol, 1.3,2.4-bis(p-n-butylbenzylidene)sorbitol, 1.3,2.4-bis(p-s-butylbenzylidene)sorbitol, 1,3,2.4-bis(p-t-butylbenzylidene) sorbitol, 1.3-(2'.4'-dimethylbenzylidene)-2.4-benzylidenesorbitol, 1.3-benzylidene-2.4-(2'.4'-dimethylbenzylidene)sorbitol, 1.3,2.4-bis(2',4'-dimethylbenzylidene)sorbitol, 1.3,2.4-bis(3',4'-dimethylbenzylidene)sorbitol, 1.3,2.4-bis(p-methoxybenzylidene)sorbitol, 1.3,2.4-bis(p-ethoxybenzylidene)sorbitol, 1.3-benzylidene-2.4-p-chlorobenzylidenesorbitol, 1.3-p-chlorobenzylidene-2.4- benzylidenesorbitol, 1.3-p-chlorobenzylidene-2.4-p-methylbenzylidenesorbitol, 1.3-p-chlorobenzylidene-2.4-p-ethylbenzylidenesorbitol, 1.3-p-methylbenzylidene-2.4-p-chlorobenzylidenesorbitol, 1.3-p-ethylbenzylidene-2.4-p-chlorobenzylidenesorbitol, 1.3,2.4-bis(p-chlorobenzylidene)sorbitol or the like.

Examples of arylphosphate compounds can include lithium bis(4-t-butylphenyl)phosphate, sodium bis(4-t-butylphenyl)phosphate, lithium bis(4-cumylphenyl)phosphate, sodium bis(4-cumylphenyl)phosphate, potassium bis(4-t-butylphenyl)phosphate, calcium mono(4-t-butylphenyl)phosphate, calcium bis(4-t-butylphenyl)phosphate, magnesium mono(4-t-butylphenyl)phosphate, magnesium bis(4-t-butylphenyl)phosphate, zinc mono(4-t-butylphenyl)phosphate, zinc bis(4-t-butylphenyl)phosphate, aluminum dihydroxy-(4-t-butylphenyl)phosphate, aluminum hydroxy-bis(4-t-butylphenyl)phosphate, aluminum tris(4-t-butylphenyl)phosphate, sodium 2,2'-methylene-bis(4,6-di-t-butylphenyl)phosphate, sodium 2,2'-ethylidene-bis(4,6-di-t-butylphenyl)phosphate, sodium 2,2'-methylene-bis(4-cumyl-6-t-butylphenyl)phosphate, lithium 2,2'-methylene-bis(4,6-di-t-butylphenyl)phosphate, lithium 2,2'-ethylidene-bis(4,6-di-t-buthylphenyl)phosphate, lithium 2,2'-methylene-bis(4-cumyl-6-t-butylphenyl)phosphate, sodium 2,2'-ethylidene-bis(4-i-propyl-6-t-butylphenyl)phosphate, lithium 2,2'-methylene-bis(4-methyl-6-t-butylphenyl)phosphate, lithium 2,2'-methylene-bis(4-ethyl-6-t-butylphenyl)phosphate, sodium 2,2'-butylidene-bis(4,6-di-methylphenyl)phosphate, sodium 2,2'-butylidene-bis(4,6-di-t-butylphenyl)phosphate, sodium 2,2'-t-octylmethylene-bis(4,6-di-methylphenyl)phosphate, sodium 2,2'-t-octylmethylene-bis(4,6-di-t-butylphenyl)phosphate, sodium 2,2'-methylene-bis(4-methyl-6-t-butylphenyl)phosphate, sodium 2,2'-methylene-bis(4-ethyl-6-t-butylphenyl)phosphate, sodium (4,'-dimethyl-6,6'-di-t-butyl-2,2'-biphenyl)phosphate, sodium 2,2'-ethylidene-bis(4-s-butyl-6-t-butylphenyl)phosphate, sodium 2,2'-methylene-bis(4,6-di-methylphenyl)phosphate, sodium 2,2'-methylene-bis(4,6-di-ethylphenyl)phosphate, potassium 2,2'-ethylidene-bis(4,6-di-t-butylphenyl)phosphate, calcium bis(2,2'-methylene-bis(4,6-di-t-butylphenyl)phosphate, magnesium bis[2,2'-methylene-bis(4,6-di-t-butylphenyl)phosphate], zinc bis[2,2'-methylene-bis(4,6-di-t-butylphenyl)phosphate], aluminum tris[2,2'-methylene-bis(4,6-di-t-butylphenyl)phosphate], calcium bis[2,2'-methylene-bis(4-methyl-6-t-butylphenyl)phosphate], calcium bis[2,2'-ethylidene-bis(4,6-di-t-butylphenyl)phosphate], calcium bis[2,2'-thiobis(4-methyl-6-t-butylphenyl)phosphate], calcium bis[2,2'-thiobis(4-ethyl-6-t-butylphenyl)phosphate], calcium bis[2,2'-thiobis(4,6-di-t-butylphenyl)phosphate], magnesium bis[2,2'-thiobis(4,6-di-t-butylphenyl)phosphate], magnesium bis[2,2'-thiobis(4-t-octylphenyl)phosphate], barium bis[2,2'-methylene-bis(4,6-di-t-butylphenyl)phosphate, calcium bis[(4,4'-dimethyl-6,6'-di-t-butyl-2,2'-biphenyl)phosphate], magnesium bis[2,2'-ethylidene-bis(4,6-di-t-butylphenyl)phosphate], barium bis[2,2'-ethylidene-bis(4,6-di-t-butylphenyl)phosphate], aluminum tris[2,2'-ethylidene-bis(4,6-di-t-butylphenyl)phosphate], aluminum dihydroxy-2,2'-methylene-bis(4,6-di-t-butylphenyl)phosphate, aluminum dihydroxy-2,2'-methylene-bis(4-cumyl-6-t-butylphenyl)phosphate, aluminum hydroxy-bis[2,2'-methylene-bis(4,6-di-t-butylphenyl)phosphate], aluminum hydroxy-bis[2,2'-methylene-bis(4-cumyl-6-t-butylphenyl)phosphate], titanium dihydroxy-bis[2,2'-methylene-bis(4,6-di-t-butylphenyl)phosphate], tin dihydroxy-bis[2,2'-methylene-bis(4,6-di-t-butylphenyl)phosphate], zirconium oxy-bis[2,2'-methylene-bis(4,6-di-t-butylphenyl)phosphate, aluminum dihydroxy-2,2'-methylene-bis(4-methyl-6-t-butylphenyl)phosphate, aluminum hydroxy-bis[2,2'-methylene-bis(4-methyl-6-t-butylphenyl)phosphate], aluminum dihydroxy-2,2'-ethylidene-bis(4,6-di-t-butylphenyl)phosphate, aluminum hydroxy-bis[2,2'-ethylidene-bis(4,6-di-t-butylphenyl)phosphate] or the like.

Examples of alkali metal salts of aliphatic monocarboxylic acids which are used in admixture with cyclic polyvalent metal aryl phosphate compounds among the said aryl phosphate compounds can include lithium, sodium or potassium salts of acetic acid, lactic acid, propionic acid, acrylic acid, octanoic acid, isooctanoic acid, nonanoic acid, decanoic acid, lauric acid, myristic acid, palmitic acid, stearic acid, oleic acid, linoleic acid, linolenic acid, 12-hydroxystearic acid, ricinolic acid, behenic acid, erucic acid, montanoic acid, melissic acid, stearoyllactic acid, β-N-laurylaminopropionic acid, β-N-methyl-N-lauroylaminopropionic acid or the like.

Examples of polymeric compounds can include poly(3-methyl-1-butene), poly(3-methyl-1-pentene), poly(3-ethyl-1-pentene), poly(4-methyl-1-pentene), poly(4-methyl-1-hexene), poly(4,4-dimethyl-1-pentene), poly(4,4-dimethyl-1-hexene), poly(4-ethyl-1-hexene), poly(3-ethyl-1-hexene), polyallylnaphthalene, polyallylnorbornane, atactic polystyrene, syndiotactic polystyrene, polydimethylstyrene, polyvinylnaphthalene, polyallylbenzene, polyallyltoluene, polyvinylcyclopentane, polyvinylcyclohexane, polyvinylcycloheptane, polyvinyltrimethylsilane, polyallyltrimethylsilane or the like.

In the present invention are particularly preferably used talc; aluminum hydroxy-bis(4-t-butylbenzoate); 1.3,2.4-dibenzylidenesorbitol, 1.3,2.4-bis(p-methylbenzylidene)sorbitol, 1.3,2.4-bis(p-ethylbenzylidene)sorbitol, 1.3,2.4-bis(2',4'-dimethylbenzylidene)sorbitol, 1.3,2.4-bis(3',4'-dimethylbenzylidene)sorbitol, 1.3-p-chlorobenzylidene-2.4-p-methylbenzylidenesorbitol, 1.3,2.4-bis(p-chlorobenzylidene)sorbitol; mixtures with aliphatic monocarboxylic acid alkali metal salts of cyclic polyvalent metal arylphosphate compounds such as sodium bis(4-t-butylphenyl)phosphate, sodium 2,2'-methylene-bis(4,6-di-t-butylphenyl)phosphate, calcium 2,2'-methylene-bis(4,6-di-t-butylphenyl)phosphate, aluminum 2,2'-methylene-bis(4,6-di-t-butylphenyl)phosphate, aluminum dihydroxy-2,2'-methylene-bis(4,6-di-t-butylphenyl)phosphate or aluminum hydroxy-bis[2,2'-methylene-bis(4,6-di-t-butylphenyl)phosphate] or the like; and polymeric compounds such as poly(3-methyl-1-butene), polyvinylcyclohexane and polyallyltrimethylsilane or the like.

The α-crystal nucleating agent may be used alone or in combination with two or more kinds.

The polypropylene resin composition of the present invention comprises 99 to 99.9999% by weight of the propylene polymer blend and 0.0001 to 1%, preferably 0.001 to 0.8% by weight of the α-crystal nucleating agent.

The polypropylene resin compositions of the present invention may be incorporated, within the range that would not adversely affect the object of the invention, with various types of additives usually employed for propylene polymer, for example, antioxidants such as phenol-, thioether- or phosphorous-antioxidants; light stabilizers; heavy metal inactivators (copper pollution inhibitors); clarifiers; β-crystal nucleating agents; lubricants; antistatic agents; anti-fogging agents; anti-blocking agents; anti-dropping agents; radical generators such as peroxides, fire retardants; auxiliaries for fire retardants; pigments; halogen scavengers; dispersing agents or neutralizing agents such as metal soaps; organic or inorganic antibacterial agents; inorganic fillers e.g., talc, mica, clay, wollastonite, zeolite, kaolin, bentonite, perlite, diatomaceous earth, asbestos, calcium carbonate, magnesium carbonate, aluminum hydroxide, magnesium hydroxide, hydrotalcite, basic aluminum lithium hydroxycarbonate hydrate, silicon dioxide, titanium dioxide, zinc oxide, magnesium oxide, calcium oxide, barium sulfate, magnesium sulfate, calcium silicate, aluminum silicate, glass fibers, potassium titanate, carbon fibers, carbon black, graphite and metallic fibers; coupling agents, e.g., silane-, titanate-, boron-, aluminate- or zircoaluminate-coupling agents, as well as inorganic or organic fillers surface-treated with any of said coupling agents, e.g., woodflours, pulps, wastepapers, synthetic fibers, natural fibers.

The polypropylene resin composition of the present invention can be produced, for example by mixing the propylene polymer blend of the invention, the α-crystal nucleating agents and various additives usually added to the above crystalline propylene polymer in the respective predetermined amounts, using conventional mixing apparatus, e.g., Henschel mixer (trade name), super mixer, ribbon blender, Banbury mixer, etc., and if desired, the resultant resin composition may be melt-kneaded and pelletized at a temperature of 170 to 300° C., preferably 200 to 270° C., using conventional extruders such as a single screw extruder, double-screw extruder, Brabender or roll to form pellets, which are used for the production of a variety of molded articles by various molding processes such as injection, extrusion, blowing or the like.

EXAMPLE

The invention is further illustrated by the following examples and comparative examples.

I. Methods for the Measurement of Physical Properties a) Intrinsic viscosity (dl/g): Measured in tetralin (tetrachloronaphthalene) at 135° C., using automatic viscometer (AVS2-type, manufactured by MITSUI TOATSU CHEMICALS, Co. Ltd, Japan).

b) Average particle size ($\mu$m) of titanium-containing solid catalyst component: Calculated from a particle size distribution measured by using Master sizer (manufactured by MALVERN Co. Ltd.).

c) Degree of particle uniformity of titanium-containing solid catalyst component: Calculated by dividing the particle size in 60% undersize by that of 10% undersize.

d) Propylene content (% by weight): Measured by Infrared absorption spectroscopy.

e) Melt flow rate (g/10 min.): Measured according to JIS K-7210.

II. Production of Propylene Polymer Blend

1) Preparation of Titanium-containing Solid Catalyst Component a) Titanium-containing Solid Catalyst Component: A-1

In a stainless steel autoclave purged with nitrogen were charged anhydrous $MgCl_2$ (95.3 g) and absolute EtOH (352 ml), and the mixture was heated at 105° C. with stirring and dissolved. After stirring was continued for one hour, the resulting solution was introduced to a two-fluids spray nozzle with a pressurized nitrogen gas (1.1 MPa) heated at 105° C. The flow rate of the nitrogen gas was 38 liters/min. Cooling liquid nitrogen was introduced into the spray tower in which the temperature was maintained at −15° C. The product was collected in cooled hexane introduced at the bottom of the tower to give 256 g of the product. The analysis of the product showed that the composition of the carrier was $MgCl_2.6EtOH$, which was the same as the starting solution.

For using as a carrier, 205 g of spherical carrier having the particle size of 45 to 212 $\mu$m were taken out by sieving. The carrier was dried by introducing nitrogen gas at the flow rate of 3 liters/min. at room temperature for 181 hours to give a dry carrier composed of $MgCl_2.1.7$ EtOH.

The dry carrier (20 g), titanium tetrachloride (160 ml) and purified 1,2-dichloroethane (240 ml) were blended in a glass flask, and heated to 100° C. with stirring. Then di-isobutylphthalate (6.8 ml) was added. After heating the mixture for additional 2 hours at 100° C., a liquid layer was removed by decantation. Again, titanium tetrachloride (160 ml) and purified 1,2-dichloroethane (320 ml) were added and the resulting mixture was maintained at 100° C. by heating for one hour. A liquid layer was removed by decantation, and the residue was washed with purified hexane and dried to give a titanium-containing solid catalyst component A-1. The average particle size of the titanium-containing solid catalyst component A-1 was 115 $\mu$m, and the analytical values were as follows: Mg 19.5 wt. %, Ti 1.6 wt. %, Cl 59.0 wt. %, di-isobutylphthalate 4.5 wt. %.

b) Titanium-containing Solid Catalyst Component: A-2

In a stainless steel autoclave purged with nitrogen were charged purified kersine (1050 ml), anhydrous $MgCl_2$ (15 g), absolute ethanol (36.3 g) and a surfactant (trade name: EMASOLE 320, produced by KAO ATLAS Co. Ltd.) (4.5 g), and the resulting mixture was elevated with stirring at 800 rpm and maintained at 120° C. for 30 minutes. The molten mixture was transferred to a 3000 ml flask equipped with a stirrer containing 1500 ml of purified kersine cooled to −10° C., using a teflon tube of 5 mm inner diameter while stirring the mixture at a high speed. The product was filtered and then thoroughly washed with hexane to obtain a carrier.

The carrier (15 g) was suspended in titanium tetrachloride (300 ml) at room temperature, di-isobutyl-phtalate (2.6 ml) was added, and the resulting suspension was raised to 120° C. After stirring and mixing the suspension at 120° C. for two hours, a solid was filtered off and suspended again in titanium tetrachloride (300 ml). After the suspension was stirred and mixed at 130° C. for 2 hours, a solid was filtered off and thoroughly washed with purified hexane to give titanium-containing solid catalyst component A-2.

The resulting titanium-containing solid catalyst component A-2 had an average particle size of 72 $\mu$m and the following analytical values: Mg 21.1 wt. %, Ti 2.4 wt. %, Cl 64.15 wt. %, di-isobutylphthalate 5.3 wt. %.

c) Titanium-containing Solid Catalyst Component: A-3

A mixture of magnesium ethoxide (300 g), 2-ethylhexanol (550 ml) and toluene (600 ml) was stirred at 93° C. for 3 hours in a carbon dioxide atmosphere of 0.20 MPa. Additional toluene (800 ml) and n-decane (800 ml) were added thereto to obtain a magnesiun carbonate solution.

Toluene (800 ml), chlorobenzene (60 ml), tetraethoxysilane (18 ml), titanium tetrachloride (17 ml) and Isopal G (isoparaffin hydrocarbon having an average carbon number of 10, boiling point: 156–176° C.)(200 ml) were stirred at 30° C. for 5 minutes, and then the magnesiun carbonate solution prepared above was added.

After additionally stirring the mixture for 5 minutes, tetrahydrofuran (44 ml) was added, and the resulting mixture was stirred at 60° C. for one hour. After stirring was ceased and a supernatant was removed, the resulting solid was washed with toluene (100 ml), chlorobenzene (200 ml) and titanium tetrachloride (200 ml) were added, and the mixture was stirred at 135° C. for one hour. After stirring was ceased and a supernatant was removed, chlorobenzene (500 ml), titanium tetrachloride (200 ml) and d-n-butylphthalate (4.2 ml) were added, and the mixture was stirred at 135° C. for 1.5 hours. The supernatant was removed and the solid was washed successively with toluene (1,200 ml), Isopal G (1,600 ml), and hexane (800 ml) to obtain titanium-containing solid catalyst component: a-3 for comparison. The resulting titanium-containing solid catalyst component A-3 had an average particle size of 18.5 μm, with the following analytical values: Mg 17.0 wt. %, Ti 2.3 wt. %, Cl 55.0 wt. %, di-isobutylphthalate 7.5 wt. %.

d) Titanium-containing Solid Catalyst Component: A-4

In a glass flask purged with nitrogen were charged titanium tetrachloride (30 ml) and toluene (20 ml) to prepare a mixed solution. To the mixed solution kept at 10° C. was a suspension prepared from magnesium diethoxide (10 g) having an average particle size of 32 μm, toluene (50 ml) and di-n-butyl phthalate (3.6 ml). Subsequently, the resulting mixture was elevated from 10° C. to 90° C. over a period of 80 minutes and reacted while stirring for 2 hrs, After completion of the reaction, the resulting solid product was washed four times with toluene (100 ml) at 90° C., and additional titanium tetrachloride (30 ml) and toluene (70 ml) were added thereto. The mixture was elevated to 112° C. and reacted while stirring for 2 hrs. After completion of the reaction, the reaction mixture was washed 10 times with n-heptane (100 ml) at 40° C. to prepare a solid catalyst component. The resulting titanium-containing solid catalyst component A-4 had an average particle size of 32 μm, with the following analytical value: Mg 18.9 wt. %, Ti 2.2 wt. %, Cl 61.6 wt. %.

2) Pre-activation of Titanium-containing Solid Catalyst Component

A 15 liters stainless steel reaction vessel equipped with slant vanes was purged with nitrogen gas and then charged with a saturated hydrocarbon solvent having a dynamic viscosity of 7.3 centistokes at 40° C. (CRYSTOL-52, manufactured by Esso Sekiyu Co., Ltd.)(8.3 liters), triethyl aluminum (525 mmol), di-isopropyl-di-methoxysilane (80 mmol) and the titanium-containing solid catalyst component prepared in the above (700 g) at room temperature. The mixture was warmed to 40° C. and reacted for 7 hours at a propylene partial pressure of 0.15 PMa to pre-activate the catalyst. The result of the analysis indicated that 3.0 g of propylene was reacted per 1 g of the titanium-containing solid catalyst component.

3) First Polymerization Step

Figure 1:
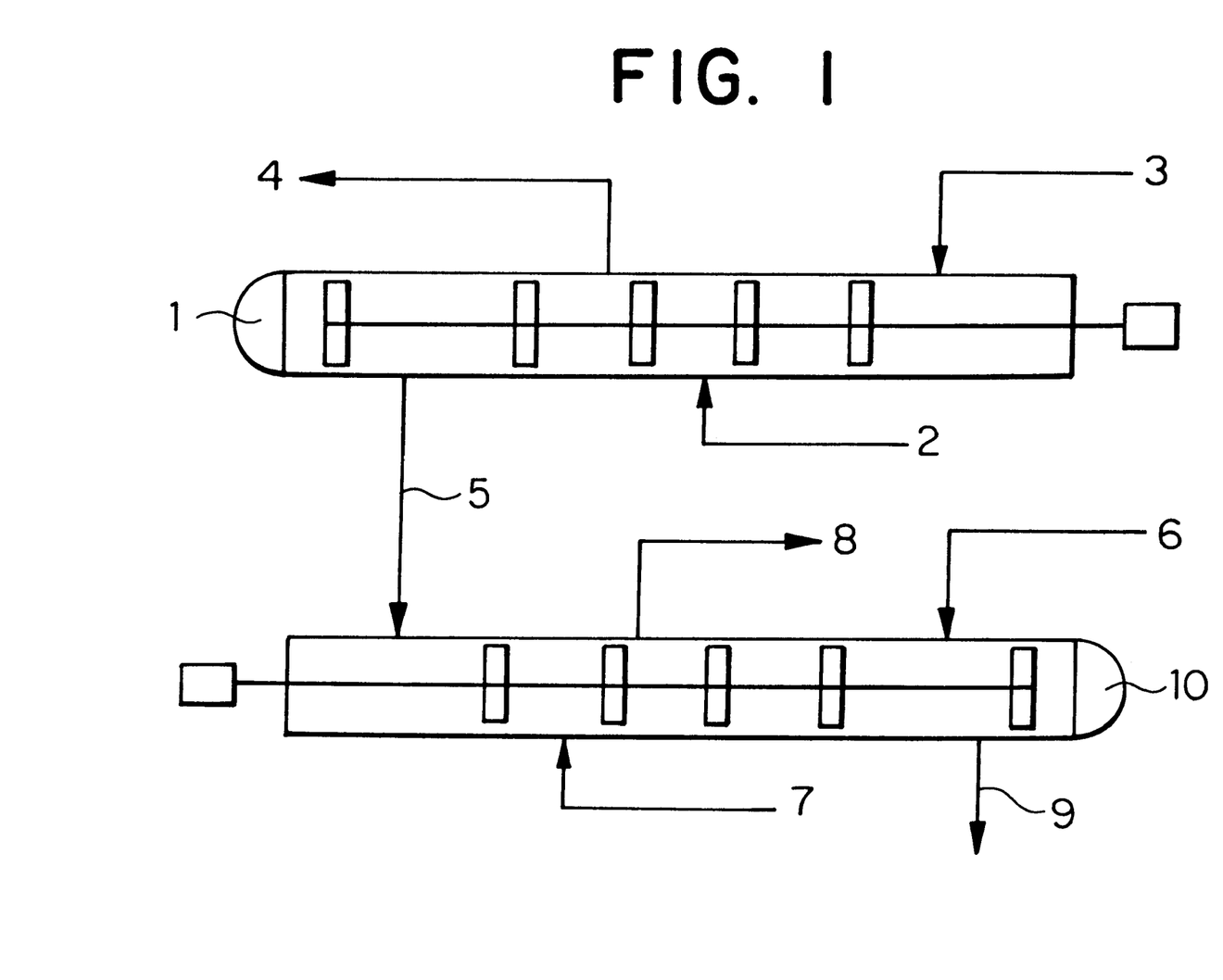
FIG. 1 is a flow sheet showing a continuous polymerization apparatus used in the examples.

Referring to the flow sheet shown in FIG. 1, a horizontal porymerization reactor equipped with stirring vanes 1 (L/D= 6, inside volume 100 liters) was fed continuously with the pre-activated titanium-containing solid catalyst component at the rate of 0.5 g/hr, triethyl aluminum as the organic aluminum compound and di-isopropyl-di-methoxysilane as the organic silicon compound in such a ratio as to give the Al/Si molar ratio shown in Tables 1–3. A mixed gas of propylene and ethylene with the $C_2/C_3$ molar ratio shown in Tables 1–3 was continuously fed, while maintaining the conditions of the reaction temperature at 65° C., the reaction pressure at 2.2 MPa and the stirring speed at 40 rpm, and further hydrogen gas was continuously fed through circulation pipe 2 so that the hydrogen concentration in the vapor phase within the reactor was kept at the $H_2/C_3$ molar ratio shown in Tables 1–3 to adjust the intrinsic viscosity of the resulting polymer, i.e. the propylene-α-olefin random copolmer (A), thus modifying the molecular weight thereof.

Reaction heat was removed by evaporation of the starting propylene supplied through piping 3. Unreacted gases discharged from the polymerization reactor was cooled and condensed outside the reaction system via piping 4 and returned to polymerization reactor 1.

The propylene-α-olefin random copolmer (A) obtained in the polymerization reactor 1 was continuously taken out from said reactor 1 via piping 5 so that the retention level of the polymer occupies 50% volume of the reactor and then introduced into polymerization reactor 10 in the second polymerization step. At this time, a part of the propylene-α-olefin random copolmer (A) was intermittently taken out from piping 5 to give a sample for measuring the propylene content, intrinsic viscosity and yield of the polymer per unit weight of the catalyst. The yield of the polymer per unit weight of the catalyst was measured by an induction bonded plasma spectral analysis (IPC method) of Mg content in a sample.

4) Second Polymerization Step

Into the horizontal polymerization reactor equipped with stirring vanes 10 (L/D=6, inner volume 100 liters), the propylene-α-olefin random copolmer (A) from the first polymerization step and a mixed gas of ethylene and propylene were continuously fed to copolymerize ethylene and propylene. Reaction conditions were as follows; stirring speed: 40 rpm, temperature: 60° C. and pressure: 2.2 MPa. The gas composition in the vapor phase was controlled to give the $C_2/C_3$ molar ratio and the $H_2/C_2$ molar ratio shown in Tables 1–3. Through piping 7, carbon monoxide was supplied as a polymerization inhibitor to control the polymerized amount of the propylene-α-olefin random copolmer (B) and hydrogen gas was supplied to control the molecular weight of the propylene-α-olefin random copolmer (B).

Reaction heat was removed by evaporation of the starting liquid propylene supplied from piping 6. Unreacted gases discharged from the polymerization reactor were cooled and condensed outside the reaction system via piping 8 and returned to the copolymerization step. The propylene polymer blend produced in the copolymerization step was taken out from polymerization reactor 10 via piping 9 so that the retention level of the polymer occupies 50% volume of the reactor.

Production rate of the propylene polymer blend was 8 to 12 kg/hr.

Monomers were removed from the propylene polymer blend taken from the reactor 10, a part of them was subjected to the measurement of the intrinsic viscosity ($[\eta_{WHOLE}]$), propylene content in the propylene-α-olefin random copolmer (B) by infrared spectrum and polymerization ratio of the copolymer component by measuring Mg content in the polymer by ICP method. Further, the flowability of powders of the propylene polymer blend was evaluated from the compressibility calculated in accordance with the following equation.

Compressibility=(Apparent compact density−Apparent loose density)×100/Apparent compact density Lower compressibility provides better flowability of the powder.

By varying the type of the titanium-containing solid catalyst component, the Al/Si molar ratio, ethylene/propylene molar ratio and hydrogen/propylene molar ratio in the first polymerization step as well as the ethylene/propylene molar ratio and hydrogen/ethylene molar ratio in the second polymerization step as shown in Tables 1–3, there were obtained the samples of Examples 1 to 6 and Comparative Examples 1 to 8.

The measured results of various properties are shown in Tables 1 to 3.

5) Production of Injection Molded Articles 4 kg of the powders as obtained above were incorporated with 0.004 kg of a phenolic heat stabilizer and 0.004 kg of calcium stearate, and mixed at room temperature for 10 minutes using a high speed stirring mixer (Henschel mixer), and each of the mixtures was granulated into pellets by an extruding granulator with a screw diameter of 40 mm. Then, a JIS type test piece was formed from the pellets using an injection molding machine in which the molten resin temperature was set at 230° C. and the mold temperature at 50° C. The resulting test pieces were conditioned in a chamber kept at 50% humidity and at room temperature 23° C. for 72 hours and measured for the various properties according to the following methods. The results are shown in Tables 1 to 3.

a) Flexural modulus (MPa): Measured according to JIS K 7203.

b) Haze: Measured according to ASTM D 1003 using a plate-like 25×50×1 mm test piece which was conditioned under the above condition.

c) Izod impact strength: Measured according to JIS K 6758.

d) Whitening on impacting: Using a du Pont impact machine (manufactured by Toyo Seiki Co. Ltd.), a load of 500 g was fallen from a height of 1 m on the conditioned plate-like 50×50×2 mm test piece, with a center of impact at 0.635 cm in radius and an anvil having an inner diameter of 3.81 cm, and a diameter of whitening area produced on the test piece by impacting was measured.

TABLE 1

| | Example | | | | | | |
|---|---|---|---|---|---|---|---|
| | 1 | 2 | 3 | 4 | 5 | 6 | 7 |
| Titanium-containing solid catalyst component | A-1 | A-1 | A-1 | A-1 | A-1 | A-2 | A-4 |
| Average particle size μm | 115 | 115 | 115 | 115 | 115 | 72 | 32 |
| Degree of uniformity | 1.74 | 1.74 | 1.74 | 1.74 | 1.74 | 1.69 | 1.2 |
| Pre-activation treatment | | | | | | | |
| Al/Ti/Si molar ratio | 2/1/0.3 | 2/1/0.3 | 2/1/0.3 | 2/1/0.3 | 2/1/0.3 | 2/1/0.3 | 3/2/0.3 |
| Olefin | PRO* | PRO* | PRO* | PRO* | PRO* | PRO* | PRO* |
| Reaction amount (g polymer/g catalyst) | 2 | 2 | 2 | 2 | 2 | 2 | 2 |
| First polymerization step | | | | | | | |
| Al/Si molar ratio | 5 | 5 | 6 | 6 | 6 | 5 | 1.5 |
| Polymerization pressure MPa | 2.2 | 2.2 | 2.2 | 2.2 | 2.2 | 2.2 | 2.2 |
| Polymerization temperature ° C. | 65 | 65 | 65 | 65 | 65 | 65 | 60 |
| $H_2/C_3$ (molar ratio) × $10^{-3}$ | 8.4 | 8.5 | 5.5 | 25 | 9.8 | 2.1 | 0.012 |
| $C_2/C_3$ (molar ratio) | 0.021 | 0.020 | 0.014 | 0.011 | 0.008 | 0.016 | 0.02 |
| Copolymer (A) | | | | | | | |
| Produced amount $W_A$ wt % | 79.8 | 75.0 | 71.0 | 71.3 | 63.7 | 78.0 | 86 |
| Intrinsic viscosity $[\eta]_A$ dl/g | 2.1 | 2.1 | 2.3 | 1.8 | 2.1 | 2.7 | 3.4 |
| Propylene content wt % | 97.0 | 97.0 | 98.5 | 98.5 | 98.5 | 97.0 | 97 |
| Melt flow rate $MFR_A$ g/10 min. | 2.2 | 2.3 | 1.5 | 6 | 2.6 | 0.5 | 0.3 |
| Second polymerization step | | | | | | | |
| Polymerization pressure MPa | 2.2 | 2.2 | 2.2 | 2.2 | 2.2 | 2.2 | 1.8 |
| Polymerization temperature ° C. | 60 | 60 | 60 | 60 | 60 | 60 | 55 |
| $C_2/C_3$ molar ratio | 0.15 | 0.34 | 0.32 | 0.32 | 0.30 | 0.28 | 0.25 |
| $H_2/C_2$ molar ratio | 0.38 | 0.40 | 0.25 | 1.05 | 0.38 | 0.71 | 0.4 |
| Copolymer (B) | | | | | | | |
| Produced amount $W_B$ wt % | 20.2 | 25.0 | 29.0 | 28.7 | 36.3 | 23.0 | 14 |
| Propylene content wt % | 75 | 63 | 65 | 65 | 66 | 67 | 64 |
| Intrinsic viscosity $[\eta]_B$ dl/g | 2.1 | 2.1 | 2.3 | 1.8 | 2.2 | 2.4 | 2.2 |
| Melt flow rate $MFR_B$ g/10 min. | 2.2 | 2.3 | 1.5 | 6.0 | 2.3 | 1.0 | 2.0 |
| Propylene polymer blend | | | | | | | |
| $W_A/W_B$ | 4.0 | 3.0 | 2.4 | 2.5 | 1.8 | 3.4 | 6.14 |
| Intrinsic viscosity $[\eta]_{WHOLE}$ dl/g | 2.1 | 2.1 | 2.3 | 1.8 | 2.1 | 2.1 | 2.2 |
| Intrinsic viscosity ratio $[\eta]_B/[\eta]_A$ | 1.0 | 1.0 | 1.0 | 1.0 | 1.0 | 0.89 | 0.65 |
| $([\eta]_B/[\eta]_A) \times (W_A/W_B)$ | 4.0 | 3.0 | 2.4 | 2.5 | 1.8 | 3.0 | 3.99 |
| Melt flow rate $MFR_{WHOLE}$ g/10 min. | 2.2 | 2.3 | 1.5 | 6.0 | 2.5 | 0.6 | 2.0 |
| Powder flowability | | | | | | | |
| Loose density g/ml | 0.36 | 0.36 | 0.36 | 0.36 | 0.34 | 0.42 | 0.45 |
| Compact density g/ml | 0.36 | 0.36 | 0.36 | 0.36 | 0.35 | 0.43 | 0.47 |
| Powder compressibility % | 0 | 0 | 0 | 0 | 2.9 | 2.3 | 4.3 |
| Physical properties of molded article | | | | | | | |
| Flexural modulus MPa | 600 | 530 | 550 | 570 | 590 | 500 | 690 |
| Haze % | 44 | 46 | 45 | 44 | 43 | 44 | 48 |
| Izod impact strength (0° C.) kJ/m$^2$ | 10.8 | 33 | >50 | 12 | >50 | >50 | 6.4 |
| (−20° C.) | 5.6 | 9.7 | 14.5 | 5.1 | >50 | 13.8 | 3.0 |
| Diameter of whitening on impacting mm | 11 | 10.5 | 12.2 | 12.5 | 11.5 | 11 | 14 |

PRO*: Propylene

TABLE 2

|  | Comparative Example | | | |
|---|---|---|---|---|
|  | 1 | 2 | 3 | 4 |
| Titanium-containing solid catalyst component | A-1 | A-1 | A-1 | A-1 |
| Average particle size μm | 115 | 115 | 115 | 115 |
| Degree of uniformity | 1.74 | 1.74 | 1.74 | 1.74 |
| Pre-activation treatment |  |  |  |  |
| Al/Ti/Si molar ratio | 2/1/0.3 | 2/1/0.3 | 2/1/0.3 | 2/1/0.3 |
| Olefin | Propylene | Propylene | Propylene | Propylene |
| Reaction amount (g polymer/g catalyst) | 2 | 2 | 2 | 2 |
| First polymerization step |  |  |  |  |
| Al/Si molar ratio | 6 | 6 | 6 | 6 |
| Polymerization pressure MPa | 2.2 | 2.2 | 2.2 | 2.2 |
| Polymerization temperature °C. | 65 | 65 | 65 | 65 |
| $H_2/C_3$ (molar ratio) × $10^{-3}$ | 82 | 71 | 5.3 | 6.4 |
| $C_2/C_3$ (molar ratio) | 0 | 0.022 | 0 | 0.014 |
| Copolymer (A) |  |  |  |  |
| Produced amount $W_A$ wt % | 75.0 | 79.0 | 88.2 | 89.1 |
| Intrinsic viscosity $[\eta]_A$ dl/g | 1.5 | 1.6 | 2.3 | 2.2 |
| Propylene content wt % | 100.0 | 97.0 | 100.0 | 98.5 |
| Melt flow rate $MFR_A$ g/10 min. | 16 | 14.5 | 1.4 | 1.8 |
| Second polymerization step |  |  |  |  |
| Polymerization pressure MPa | 2.2 | 2.2 | 2.2 | 2.2 |
| Polymerization temperature °C. | 60 | 60 | 60 | 60 |
| $C_2/C_3$ molar ratio | 0.32 | 0.63 | 0.4 | 0.85 |
| $H_2/C_2$ molar ratio | 0.06 | 0.06 | 0.21 | 0.88 |
| Copolymer (B) |  |  |  |  |
| Produced amount $W_B$ wt % | 25.0 | 21.0 | 11.8 | 10.0 |
| Propylene content wt % | 65 | 55 | 62 | 50 |
| Intrinsic viscosity $[\eta]_B$ dl/g | 2.9 | 2.9 | 2.3 | 1.8 |
| Melt flow rate $MFR_B$ g/10 min. | 0.4 | 0.4 | 1.4 | 5.3 |
| Propylene polymer blend |  |  |  |  |
| $W_A/W_B$ | 3.0 | 3.8 | 7.5 | 8.9 |
| Intrinsic viscosity $[\eta]_{WHOLE}$ dl/g | 1.8 | 1.9 | 2.3 | 2.2 |
| Intrinsic viscosity ratio $[\eta]_B/[\eta]_A$ | 1.9 | 1.8 | 1.0 | 0.84 |
| $([\eta]_B/[\eta]_A) \times (W_A/W_B)$ | 5.8 | 6.8 | 7.5 | 7.5 |
| Melt flow rate $MFR_{WHOLE}$ g/10 min. | 6.4 | 6.8 | 1.4 | 1.8 |
| Powder flowability |  |  |  |  |
| Loose density g/ml | 0.36 | 0.36 | 0.36 | 0.36 |
| Compact density g/ml | 0.36 | 0.36 | 0.36 | 0.36 |
| Powder compressibility % | 0 | 0 | 0 | 0 |
| Physical properties of molded article |  |  |  |  |
| Flexural modulus MPa | 750 | 550 | 860 | 650 |
| Haze % | 92 | 92 | 68 | 60 |
| Izod impact strength (0° C.) kJ/m² | 10 | 7.8 | 7.8 | 6.5 |
| (−20° C.) | 6.3 | 5.3 | 5.3 | 3 |
| Diameter of whitening on impacting mm | 24.2 | 22 | 18 | 17 |

TABLE 3

|  | Comparative Example | | | |
|---|---|---|---|---|
|  | 5 | 6 | 7 | 8 |
| Titanium-containing solid catalyst component | A-1 | A-1 | A-1 | A-3 |
| Average particle size μm | 115 | 115 | 115 | 16.2 |
| Degree of uniformity | 1.74 | 1.74 | 1.74 | 2.2 |
| Pre-activation treatment |  |  |  |  |
| Al/Ti/Si molar ratio | 2/1/0.3 | 2/1/0.3 | 2/1/0.3 | 2/1/0.3 |
| Olefin | Propylene | Propylene | Propylene | Propylene |

TABLE 3-continued

|  | Comparative Example | | | |
|---|---|---|---|---|
|  | 5 | 6 | 7 | 8 |
| Reaction amount (g polymer/g catalyst) | 2 | 2 | 2 | 2 |
| First polymerization step | | | | |
| Al/Si molar ratio | 6 | 6 | 6 | 6 |
| Polymerization pressure MPa | 2.2 | 2.2 | 2.2 | 2.2 |
| Polymerization temperature ° C. | 65 | 65 | 65 | 65 |
| $H_2/C_3$ (molar ratio) × $10^{-3}$ | 6.1 | 35 | 4.0 | 2.8 |
| $C_2/C_3$ (molar ratio) | 0.014 | 0.023 | 0.005 | 0.006 |
| Copolymer (A) | | | | |
| Produced amount $W_A$ wt % | 89.1 | 69.7 | 88.5 | 69.7 |
| Intrinsic viscosity $[\eta]_A$ dl/g | 2.2 | 1.7 | 2.4 | 2.6 |
| Propylene content wt % | 98.5 | 96.8 | 99.5 | 98.5 |
| Melt flow rate $MFR_A$ g/10 min. | 1.8 | 7.6 | 1.1 | 0.7 |
| Second polymerization step | | | | |
| Polymerization pressure MPa | 2.2 | 2.2 | 2.2 | 2.2 |
| Polymerization temperature ° C. | 60 | 60 | 60 | 60 |
| $C_2/C_3$ molar ratio | 0.06 | 0.14 | 0.05 | 0.34 |
| $H_2/C_2$ molar ratio | 0.89 | 0.004 | 0.31 | 0.49 |
| Copolymer (B) | | | | |
| Produced amount $W_B$ wt % | 10.0 | 20.0 | 11.5 | 30.3 |
| Propylene content wt % | 85 | 75 | 86 | 59 |
| Intrinsic viscosity $[\eta]_B$ dl/g | 1.8 | 4.2 | 2.1 | 2.4 |
| Melt flow rate $MFR_B$ g/10 min. | 5.3 | 0.036 | 2.1 | 1.5 |
| Propylene polymer blend | | | | |
| $W_A/W_B$ | 8.9 | 3.5 | 7.7 | 2.3 |
| Intrinsic viscosity $[\eta]_{WHOLE}$ dl/g | 2.2 | 2.1 | 2.36 | 2.3 |
| Intrinsic viscosity ratio $[\eta]_B/[\eta]_A$ | 0.84 | 2.5 | 0.88 | 0.92 |
| $([\eta]_B/[\eta]_A) \times (W_A/W_B)$ | 7.5 | 8.5 | 6.8 | 2.1 |
| Melt flow rate $MFR_{WHOLE}$ g/10 min. | 1.8 | 2.6 | 1.2 | 1.4 |
| Powder flowability | | | | |
| Loose density g/ml | 0.36 | 0.36 | 0.36 | 0.46 |
| Compact density g/ml | 0.36 | 0.36 | 0.36 | 0.37 |
| Powder compressibility % | 0 | 0 | 0 | 19.6*1 |
| Physical properties of molded article | | | | |
| Flexural modulus MPa | 600 | 530 | 850 | |
| Haze % | 50 | 74 | 59 | |
| Izod impact strength (0° C.) kJ/m$^2$ | 5 | 11.8 | 6.1 | |
| (−20° C.) | 2.7 | 7 | 3.3 | |
| Diameter of whitening on impacting mm | 10 | 14 | 12 | |

*1 Finally, the operation stops.

III. Production of Polypropylene Resin Composition
1) Preparation and Pre-activation of Titanium-containing Solid Catalyst Component The same catalyst as the above A-1 was prepared and preactivated in the above manner.

2) Production of Propylene Polymer Blend
a) First Polymerization Step

Referring to the flow sheet shown in FIG. 1, a horizontal porymerization reactor equipped with stirring vanes 1 (L/D= 6, inside volume 100 liters) was fed continuously with the pre-activated titanium-containing solid catalyst component at the rate of 0.5 g/hr, triethyl aluminum as the organic aluminum compound and di-isopropyl-di-methoxysilane as the organic silicon compound in such a ratio as to give the Al/Si molar ratio shown in Table 4. A mixed gas of propylene and ethylene with the $C_2/C_3$ molar ratio shown in Table 4 was continuously fed to the reactor, while maintaining the conditions of the reaction temperature at 65° C., the reaction pressure at 2.2 MPa and the stirring speed at 40 rpm, and further hydrogen gas was continuously fed through circulation pipe 2 so that the hydrogen concentration in the vapor phase within the reactor was kept at the $H_2/C_3$ molar ratio shown in Table 4 to adjust the intrinsic viscosity of the resulting polymer, i.e. the propylene-α-olefin random copolmer (A), thus modifying the molecular weight thereof.

Reaction heat was removed by evaporation of the starting propylene supplied through piping 3. Unreacted gases discharged from the polymerization reactor was cooled and condensed outside the reaction system via piping 4 and returned to polymerization reactor 1.

The propylene-α-olefin random copolmer (A) obtained in the polymerization reactor 1 was continuously taken out from said reactor 1 via piping 5 so that the retention level of the polymer occupies 50% volume of the reactor and then introduced into polymerization reactor 10 in the second polymerization step. At this time, a part of the propylene-α-olefin random copolmer (A) was intermittently taken out from piping 5 to give a sample for measuring the propylene content, intrinsic viscosity and yield of the polymer per unit weight of the catalyst. The yield of the polymer per unit weight of the catalyst was measured by an induction bonded plasma spectral analysis (IPC method) of Mg content in a sample.

b) Second Polymerization Step

Into the horizontal polymerization reactor equipped with stirring vanes 10 (L/D=6, inner volume 100 liters), the propylene-α-olefin random copolmer (A) from the first polymerization step and a mixed gas of ethylene and propylene were continuously fed to copolymerize ethylene and propylene. Reaction conditions were as follows; stirring speed: 40 rpm, temperature: 60° C. and pressure: 2.2 MPa. The gas composition in the vapor phase was controlled to give the $C_2/C_3$ molar ratio and the $H_2/C_2$ molar ratio shown in Table 4. Through piping 7, carbon monoxide was supplied as a polymerization inhibitor to control the polymerized amount of the propylene-α-olefin random copolymer (B) and hydrogen gas was supplied to control the molecular weight of the propylene-α-olefin random copolymer (B).

Reaction heat was removed by evaporation of the starting liquid propylene supplied from piping 6. Unreacted gases discharged from the polymerization reactor were cooled and condensed outside the reaction system via piping 8 and returned to the copolymerization step. The propylene polymer blend produced in the copolymerization step was taken out from polymerization reactor 10 via piping 9 so that the retention level of the polymer occupies 50% volume of the reactor.

Production rate of the propylene polymer blend was 8 to 12 kg/hr.

Monomers were removed from the propylene polymer blend taken from the reactor 10, a part of them was subjected to the measurement of the intrinsic viscosity ($[\eta_{WHOLE}]$), propylene content in the propylene-α-olefin random copolmer (B) by infrared spectrum and polymerization ratio of the copolymer component by measuring Mg content in the polymer by ICP method.

By varying the type of the titanium-containing solid catalyst component, the Al/Si molar ratio, ethylene/propylene molar ratio and hydrogen/propylene molar ratio in the first polymerization step as well as the ethylene/propylene molar ratio and hydrogen/ethylene molar ratio in the second polymerization step as shown in Table 4, there were obtained the samples of Examples 7 to 11 and Comparative Examples 9 to 10.

The measured results of various properties are shown in Table 4.

3) Production of Injection Molded Articles 100 parts by weight of the powdered propylene polymer blend as obtained above were incorporated with sodium 2,2'-methylene-bis(4,6-di-t-butylphenyl)phosphate, aluminum hydroxy-bis(4-t-butylbenzoate) or 1.3,2.4-bis(p-methylbenzylidene)sorbitol as an α-crystal nucleating agent in an amount (part by weight) indicated in Table 4, 0.1 part by weight of tetraxis(methylene-3-(3',5'-di-t-butyl-4'-hydroxyphenyl)propionate)methane as a phenolic heat stabilizer and 0.1 part by weight of calcium stearate as a neutralizer, and mixed at room temperature for 10 minutes using a high speed stirring mixer (Henschel mixer), and the mixture was granulated into pellets using an extruding granulator with a screw diameter of 40 mm in which a cylinder temperature was set at 230° C. Then, a JIS type test piece was formed from the pellets using an injection molding machine in which the molten resin temperature was set at 250° C. and the mold temperature was set at 50° C. The resulting test piece was conditioned in a chamber kept at 50% humidity and at room temperature 23° C. for 72 hours and measured for the various properties according to the methods as mentioned above. The results are shown in Table 4.

TABLE 4

|  | Example | | | | | Comparative Example | |
| --- | --- | --- | --- | --- | --- | --- | --- |
|  | 7 | 8 | 9 | 10 | 11 | 9 | 10 |
| First polymerization step | | | | | | | |
| Al/Si molar ratio | 5 | 5 | 5 | 6 | 6 | 6 | 6 |
| Polymerization pressure MPa | 2.2 | 2.2 | 2.2 | 2.2 | 2.2 | 2.2 | 2.2 |
| Polymerization temperature ° C. | 65 | 65 | 65 | 65 | 65 | 65 | 65 |
| $H_2/C_3$ (molar ratio) × $10^{-3}$ | 8.4 | 8.4 | 8.4 | 5.5 | 25 | 35 | 71 |
| $C_2/C_3$ (molar ratio) | 0.021 | 0.021 | 0.021 | 0.014 | 0.011 | 0.023 | 0.022 |
| Copolymer (A) | | | | | | | |
| Produced amount $W_A$ wt % | 79.8 | 79.8 | 79.8 | 71.0 | 71.3 | 80.0 | 79.0 |
| Intrinsic viscosity $[\eta]_A$ dl/g | 2.1 | 2.1 | 2.1 | 2.3 | 1.8 | 1.7 | 1.6 |
| Propylene content wt % | 97.0 | 97.0 | 97.0 | 98.5 | 98.5 | 97 | 97.0 |
| Melt flow rate $MFR_A$ g/10 min. | 2.2 | 2.2 | 2.2 | 1.5 | 6 | 7.6 | 14.5 |
| Second polymerization step | | | | | | | |
| Polymerization pressure MPa | 2.2 | 2.2 | 2.2 | 2.2 | 2.2 | 2.2 | 2.2 |
| Polymerization temperature ° C. | 60 | 60 | 60 | 60 | 60 | 60 | 60 |
| $C_2/C_3$ molar ratio | 0.15 | 0.15 | 0.15 | 0.32 | 0.32 | 0.14 | 0.7 |
| $H_2/C_2$ molar ratio | 0.38 | 0.38 | 0.38 | 0.25 | 1.05 | 0.004 | 0.06 |
| Copolymer (B) | | | | | | | |
| Produced amount $W_B$ wt % | 20.2 | 20.2 | 20.2 | 29.0 | 28.7 | 20.0 | 21.0 |
| Propylene content wt % | 75 | 75 | 75 | 65 | 65 | 75 | 50 |
| Intrinsic viscosity $[\eta]_B$ dl/g | 2.1 | 2.1 | 2.1 | 2.3 | 1.8 | 4.2 | 2.9 |
| Melt flow rate $MFR_B$ g/10 min. | 2.2 | 2.2 | 2.2 | 1.5 | 6.0 | 0.036 | 0.4 |
| Propylene polymer blend | | | | | | | |
| $W_A/W_B$ | 4.0 | 4.0 | 4.0 | 2.4 | 2.5 | 4.0 | 3.8 |
| Intrinsic viscosity $[\eta]_{WHOLE}$ dl/g | 2.1 | 2.1 | 2.1 | 2.3 | 1.8 | 2.1 | 1.9 |
| Intrinsic viscosity ratio $[\eta]_B/[\eta]_A$ | 1.0 | 1.0 | 1.0 | 1.0 | 1.0 | 2.5 | 1.8 |
| $([\eta]_B/[\eta]_A) \times (W_A/W_B)$ | 4.0 | 4.0 | 4.0 | 2.4 | 2.5 | 9.8 | 6.8 |
| Melt flow rate $MFR_{WHOLE}$ g/10 min. | 2.2 | 2.2 | 2.2 | 1.5 | 6.0 | 2.6 | 6.8 |

TABLE 4-continued

|  | Example | | | | | Comparative Example | |
|---|---|---|---|---|---|---|---|
|  | 7 | 8 | 9 | 10 | 11 | 9 | 10 |
| Propylene resin composition | | | | | | | |
| Propylene polymer blend part by weight | 100 | 100 | 100 | 100 | 100 | 100 | 100 |
| α-crystal nucleating agent | | | | | | | |
| [1]part by weight | 0.3 | 0 | 0 | 0 | 0 | 0 | 0 |
| [2]part by weight | 0 | 0.3 | 0 | 0 | 0 | 0 | 0 |
| [3]part by weight | 0 | 0 | 0.3 | 0.3 | 0.3 | 0.3 | 0.3 |
| Physical properties of molded article | | | | | | | |
| Bending modulus MPa | 650 | 620 | 610 | 550 | 670 | 570 | 600 |
| Haze % | 20 | 16 | 15 | 28 | 32 | 50 | 90 |
| Izod impact strength (0° C.) kJ/m² | 40 | 40 | 45 | >50 | >50 | >50 | >50 |
| (−20° C.) | 5.5 | 6 | 7 | 17 | 6.5 | 7 | 10 |
| Diameter of whitening on impacting mm | 11.5 | 11.5 | 11 | 12.2 | 12.5 | 14 | 20 |

α-crystal nucleating agent [1]: Sodium 2, 2'-methylene-bis(4, 6-di-t-butylphenyl)phosphate
α-crystal nucleating agent [2]: Aluminum hydroxyoxy-bis(4-t-butylbenzoate)
α-crystal nucleating agent [3]: 1.3, 2.4-bis(p-methylbenzylidene)sorbitol Industrial Applicability of the Invention The molded articles produced from the propylene polymer blends satisfying the above-mentioned physical properties of the present invention and the polypropylene resin compositions containing α-crystal nucleating agents are excellent in transparency, stress-whitening resistance and low-temperature impact resistance as well as the balance thereof. The processes of producing the propylene polymer blends of the present invention are very high in productivity, because of continuous process.

What is claimed is:

1. A propylene polymer blend comprising
    (A) a propylene-ethylene or proplene-α-olefin random copolymer with a propylene content of 90 to 99% by weight and
    (B) a propylene-ethylene or propylene-α-olefin random copolymer with a propylene content of 55 to 90% by weight,
    wherein the derived intrinsic viscosity ($[\eta_B]$) of the copolymer B ranges from 1.3 to 3.5 dl/g, the ratio ($[\eta_B]/[\eta_A]$) of the derived intrinsic viscosity ($[\eta_B]$) of the copolymer B to the intrinsic viscosity ($[\eta_A]$) of the copolymer A ranges from 0.6 to 1.2 and a product (($[\eta_B]/[\eta_A]$)×($W_A/W_B$)) of the intrinsic ratio ($[\eta_B]/[\eta_A]$) of both copolymers and the weight ratio ($W_A/W_B$) of both copolymers ranges from 1.0 to 4.5.

2. The polymer blend of claim 1 wherein the content of the copolymer B ranges from 10 to 50% by weight based on the weight of the polymer blend.

3. A process of producing the propylene polymer blend of claim 1 which comprises in sequence:
    (a) carrying out a first polymerization step wherein propylene and other α-olefins than propylene are copolymerized in a vapor phase in the presence of a catalyst for a stereoregular olefin polymerization which comprises a combination of a titanium-containing solid catalyst component having an average particle size of 20–300 μm, an organoaluminum compound of the formula $AlR^1_mX_{3-m}$ wherein $R^1$ is a hydrocarbyl group of 1–20 carbons, X is a halogen atom and m is a positive number of $3 \geq m \geq 1.5$, and an organosilicon compound of the formula $R^2_xR^3_ySi(OR^4)_z$ wherein $R^2$ and $R^4$ is a hydrocarbyl group, $R^3$ is a hydrocarbyl group or a hydrocarbyl group containing a hetero atom, X, Y and Z have a relationship of $0 \leq X \leq 2$, $1 \leq Y \leq 3$, $1 \leq Z \leq 3$, and X+Y+Z=4, to produce 90 to 50% by weight of a propylene-α-olefin random copolymer (A) based on the total weight of the polymer blend and then
    (b) carrying out a second polymerization step wherein propylene and other α-olefins than propylene are copolymerized to produce 10 to 50% by weight of a propylene-α-olefin random copolymer (B) having a propylene content of 55 to 90% by weight, based on the total weight of the polymer blend.

4. The process of claim 3 wherein the titanium-containing solid catalyst component has a particle uniformity of not more than 2.0.

5. The process of claim 3 wherein the molar ratio of the organoaluminum compound to the organosilicon compound (Al/Si) ranges from 1 to 10.

6. A polypropylene resin composition which comprises 99 to 99.9999% by weight of the propylene polymer blend of claim 1 and 1 to 0.0001% by weight of an α-crystal nucleating agent.

7. The resin composition of claim 6 wherein the propylene polymer blend contains 10 to 50% by weight of a propylene-α-olefin random copolymer B based on the weight of the polymer blend.

8. The resin composition of claim 6 wherein the α-crystal nucleating agent is selected from the group consisting of talc, metal salts of aromatic carboxylic acids, dibenzylidene solbitol compounds, metal salts of aromatic phosphoric acids, poly(3-methyl-1-butene), polyvinyl cyclohexane, polyallyltrimethylsilane and the mixture thereof.

* * * * *

UNITED STATES PATENT AND TRADEMARK OFFICE
CERTIFICATE OF CORRECTION

PATENT NO. : 6,319,991 B1  
DATED : November 20, 2001  
INVENTOR(S) : Chikashi Okayama et al.

It is certified that error appears in the above-identified patent and that said Letters Patent is hereby corrected as shown below:

Column 23,
Line 2, replace "proplene" with -- propylene --
Line 15, at the end of the claim insert -- , wherein copolymer A is prepared in the presence of a steroregular olefin polymerization catalyst comprising a titanium-containing solid catalyst component --

Column 24,
Line 4, replace "solbitol" with -- sorbitol --

Signed and Sealed this

Eleventh Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,319,991 B1
DATED         : November 20, 2001
INVENTOR(S)   : Chikashi Okayama et al.

It is certified that error appears in the above-identified patent and that said Letters Patent is hereby corrected as shown below:

Column 23,
Line 2, replace "proplene" with -- propylene --
Line 15, at the end of the claim insert -- , wherein copolymer A is prepared in the presence of a stereo regular olefin polymerization catalyst comprising a titanium-containing solid catalyst component --

Column 24,
Line 4, replace "solbitol" with -- sorbitol --

This certificate supersedes Certificate of Correction issued June 11, 2002.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,319,991 B1                                           Page 1 of 1
DATED         : November 20, 2001
INVENTOR(S)   : Chikashi Okayama et al.

It is certified that error appears in the above-identified patent and that said Letters Patent is hereby corrected as shown below:

Column 23,
Line 2, replace "proplene" with -- propylene --
Line 15, at the end of the claim insert -- , wherein copolymer A is prepared in the presence of a stereoregular olefin polymerization catalyst comprising a titanium-containing solid catalyst component --

Column 24,
Line 4, replace "solbitol" with -- sorbitol --

This certificate supersedes Certificate of Correction issued February 11, 2003.

Signed and Sealed this

Fifteenth Day of April, 2003

JAMES E. ROGAN
*Director of the United States Patent and Trademark Office*